(12) United States Patent
Schepperle

(10) Patent No.: US 7,444,896 B2
(45) Date of Patent: Nov. 4, 2008

(54) SHIFTING DEVICE

(75) Inventor: Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 289 days.

(21) Appl. No.: 10/572,610

(22) PCT Filed: Sep. 15, 2004

(86) PCT No.: PCT/EP2004/010296

§ 371 (c)(1),
(2), (4) Date: Mar. 20, 2006

(87) PCT Pub. No.: WO2005/038309

PCT Pub. Date: Apr. 28, 2005

(65) Prior Publication Data

US 2006/0230860 A1 Oct. 19, 2006

(30) Foreign Application Priority Data

Oct. 13, 2003 (DE) ................................. 103 47 492

(51) Int. Cl.
*F16H 59/00* (2006.01)
*F16H 61/00* (2006.01)
*F16H 63/00* (2006.01)
(52) U.S. Cl. ..................... 74/335; 74/337.5; 74/473.21; 74/473.23; 74/473.24
(58) Field of Classification Search .................... 74/335, 74/337.5
See application file for complete search history.

(56) References Cited

U.S. PATENT DOCUMENTS

| 5,271,291 | A | 12/1993 | Knape |
| 5,463,911 | A | 11/1995 | Knoedel et al. |
| 5,724,856 | A | 3/1998 | Back |
| 6,357,316 | B1* | 3/2002 | Bieber ...................... 74/473.24 |
| 6,370,976 | B1* | 4/2002 | Doppling et al. ........... 74/337.5 |
| 6,615,682 | B2 | 9/2003 | Meyer et al. |
| 6,691,590 | B1* | 2/2004 | Patzner et al. ............. 74/473.24 |
| 7,225,700 | B2* | 6/2007 | Beer et al. ................ 74/473.37 |
| 2002/0005079 | A1 | 1/2002 | Paetzold |

FOREIGN PATENT DOCUMENTS

| DE | 2 317 725 | 10/1973 |
| DE | 195 25 834 A1 | 11/1996 |
| DE | 198 40 681 A1 | 3/2000 |
| DE | 198 41 153 A1 | 3/2000 |
| DE | 198 43 584 A1 | 3/2000 |
| EP | 1 310 707 A1 | 5/2003 |

* cited by examiner

*Primary Examiner*—David D. Le
(74) *Attorney, Agent, or Firm*—Davis Bujold & Daniels, P.L.L.C.

(57) ABSTRACT

A shifting device for the shifting of a transmission with a shifting shaft (2), having a multiplicity of shifting forks or shifting levers (8, 10, 12, 14) placed in an axial slidable manner for the carrying out of a shifting procedure with a selection apparatus (28, 30, 32, 42, 44, 46) for the choice of a shifting fork (8, 10, 12, 14) from the multiplicity of shifting forks for the carrying out of the shifting procedure and with blocking disk (52) for the prevention of the movement of non-chosen shifting forks (8, 10, 12, 14). The elements (2, 8, 10, 12, 14, 20, 22) for the carrying out of the shifting procedure are made from a material of high structural strength and the elements of the selection apparatus (28, 30, 32, 42, 44, 46) and the blocking apparatus (52) are constructed from a material of lesser structural strength.

15 Claims, 2 Drawing Sheets

SHIFTING DEVICE

This application is a national stage completion of PCT/EP2004/010296 filed Sep. 15, 2004 which claims priority from German Application Serial No. 103 47 492.7 filed Oct. 13, 2003.

FIELD OF THE INVENTION

The invention concerns a shifting device.

BACKGROUND OF THE INVENTION

For the shifting of a transmission, especially where vehicles are concerned, a shifting device is provided in the transmission with the aid of which the individual gear stages can be engaged. As this is done, it is possible that parts of the shifting device can be moved manually by the vehicle driver or, alternating, this function may be carried out by actuators which are energized by at least one auxiliary power medium to execute the necessary movements required by the shifting mechanism.

Customarily, the expended forces which are sufficient for the selection of the individual gear stages are less than those forces to be exerted upon the shifting of the selected gear stage, which has a result that the elements of the selection apparatus on the shifting device can be otherwise dimensioned than are those of the necessary components, which are intended for the execution of the shifting.

The costs for a shifting device of this kind for a transmission are essentially dependent upon the complexity of the employed installed components, upon the materials thereof, upon the required expense for the mechanical working of the components and further upon manufacturing costs for the machining, shaping and heat treatment.

DE A1 198 43 584 makes known a shifting apparatus for a multistage shifting transmission wherein, on a single shifting shaft, a multiplicity of shifting forks are placed. A selection mechanism enables the choice of one of the shifting forks by way of the turning of a shifting shaft. Alternately, if the shifting shaft is axially displaced, then the respectively selected shifting fork is activated to carry out the intended shifting action. A blocking shaft, placed parallel to the shifting shaft, is likewise rotated upon the turning of the shifting shaft and thereby, employing, in its function as a blocking shaft, the movement of such shifting forks which were not chosen as indicated above. The components for this construction must be manufactured in a complex manner and at high cost. Following the assembly of the components, the co-action of the functioning parts generates noise and frequently leads to critical noise problems.

EP-B1 0 633 412 teaches of an actuator for a sliding collar enclosed in a shifting transmission, having a shifting rod located and slidable in the direction of its longitudinal axis on which a shifting fork, as well as a ring-shaped engagement unit, are rigidly affixed. The actuation apparatus is constructed as a combined plastic-metal component, where a metal part, which serves as the ring-shaped engagement unit as well as a core for the shifting rod, is sprayed with a plastic material and the shifting fork consists exclusively of plastic. In this assembly, simply a combination of plastic and metal must be created as a component, in order to assure the required stability of a component necessary for the shifting of a gear stage.

The purpose of the invention is to demonstrate a shifting device, which can be economically manufactured and can operate at a low noise level without containing a complex binding construction.

SUMMARY OF THE INVENTION

According to the invention, a shifting device for the shifting of a transmission possesses a shifting shaft upon which a multiplicity of shifting forks or shifting rockers (hereinafter referred to as "shifting forks") are placed in an axial, slidable alignment for the execution of shifting procedures. Provided are: a) a selection apparatus for the choice of one of the shifting forks out of the multiplicity of shifting forks and b) blocking disks for the prevention of an axial motion of the non-chosen shifting forks. For the carrying out of shifting procedures, these elements are being constructed of a material of greater structural strength while, contrarily, the elements of the selection apparatus are being made from a material of lower grade.

In an advantageous embodiment, the elements of the selection apparatus make use of ring-shaped engagement units, specifically for each shifting fork. The ring-shaped engagement units are axially affixed and slidable along the shifting shaft to enable the execution of the shifting procedure. The ring-shaped engagement units are rotatable about the shifting shaft for the selection of one of the shifting forks and possess elements of a come-along apparatus, which enable an axial sliding of the ring-shaped engagement unit because of the axial motion of the shifting shaft in the shifting procedure.

Another advantageous embodiment demonstrates, that the ring-shaped engagement units on the shaping fork, coact with a blocking means for prevention of axial motion of non-chosen shifting forks on the shifting shaft.

In a particularly advantageous embodiment, elements of the blocking means incorporate rotatable blocking disks, the circumferences of which extend into an axial movement area of the ring-shaped engagement units. The contour of a blocking disk is designed in such a manner that the eliminated zone of the blocking disks, which is in segmental shape, allow an axial movement of the ring-shaped engagement units on the shifting shaft, while other areas of the blocking disks are appropriate for preventing an axial movement of the ring-shaped engagement units.

Advantageously, recesses are present on the ring-shaped engagement units, which recesses co-act with projections on the shifting shaft. The projections penetrate the recesses, if the associated shifting forks are not engaged and further the projections slide the ring-shaped engagement units axially if the selected shifting fork is in a displaced position in order to change the gear stage.

The elements of the selection apparatus exhibit advantageously, exhibit complementary toothings which mesh and enable a rotation of the elements of the selection apparatus in relation to one another. In this operation, due to their formation, only parts of the ring-shaped engagement unit possess toothing.

Representing one embodiment, an area of a section in the blocking disks can exhibit a toothing, which can mesh into the toothing of a ring-shaped engagement unit.

An inventive embodiment would be especially advantageous, if the elements for the carrying out shifting procedure were made of steel or aluminum, while the elements of the selection apparatus and of the blocking disks are constructed of aluminum or plastic or, again, from a combined compounding.

In the case of a particularly advantageous design of the invention, an actuator can be provided for the axial displacement of the shifting shaft, while an additional actuator governs the elements of the selection apparatus as well as those of the of the blocking disks. In this way, a transmission becomes available for ratio control of rotation of the shifting shaft actuator in an axial movement thereof.

Advantageously, at least one actuator is provided, which is designed to operate electromechanically, pneumatically or hydraulically.

BRIEF DESCRIPTION OF THE DRAWINGS

The invention will now be described, by way of example, with reference to the accompanying drawings in which.

DETAILED DESCRIPTION OF THE INVENTION

Figure 1:
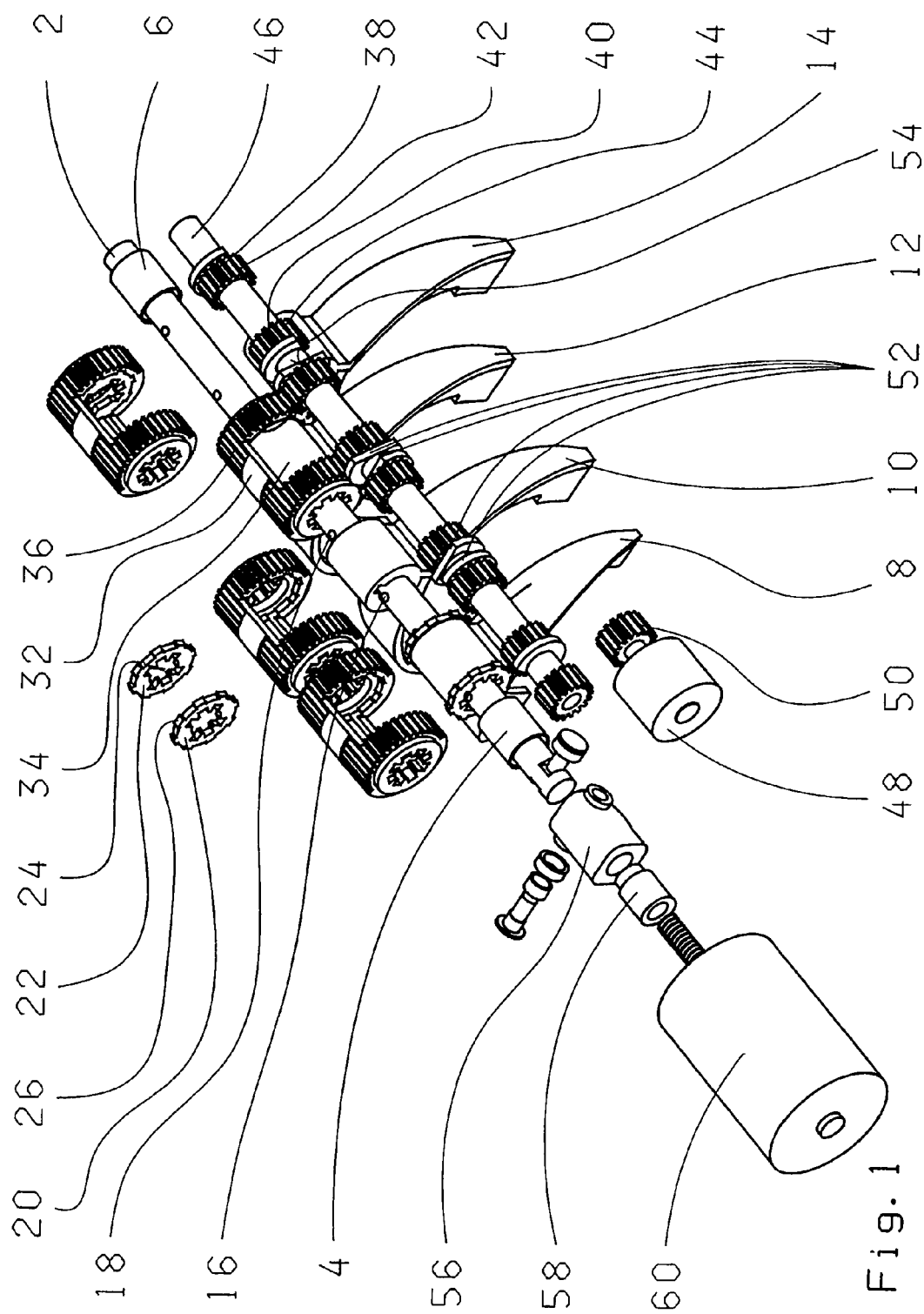
FIG. 1 is a first shifting device with individual elements.

According to FIG. 1, four shifting forks, namely 8, 10, 12 and 14 are placed on a shifting shaft 2. Shifting shaft 2 is axially slidably supported in bearings 4 and 6 which, in turn, are affixed in a housing (not shown) of the shifting transmission. The shifting forks are installed so as to be moveable in relation to the shifting shaft 2. For the purposes of clarity of illustration and better understanding, not all possible shifting forks are shown on the shaft 2. Further, individual elements of the shifting device are presented in a somewhat exploded view separate from the shifting shaft. In a completed assembly, however, all shifting forks are located in a manner similar to that of shifting fork 12, which is shown on the shifting shaft 2. Presented in FIG. 1 is an arrangement of the three shifting forks 8, 10 and 12 of the shifting shaft 2, while the shifting fork 14 is placed underneath the shifting shaft 2 in this arrangement. The following components, described here, serve analogously for every shifting fork, if these also can be described and explained by a single typical shifting fork, because of their common characteristics.

The shifting shaft 2 possesses projections in the form of two pins 16, 18 on the shifting fork 10, which enclose the shifting fork 10 between them. Between pins 16 and 18 and the shifting fork 10 is to be found at each side of the shifting fork 10, one sheet metal, contoured disk 20, 22. The contoured disks 20, 22 are bounded on their inner circumference, similar openings 24 through which, respectively, the pins 16 and 18 can be axially inserted. The remaining area between each of the openings 24, bounded by the inner circumference of a contoured disk 20 and 22 is able, by a mutual turning of a contoured disk 20 and 22 on the shifting shaft 2, with the aid of the pins 16 and 18, to make a mutual overlap. Thereby, in a case of an axial movement of the shifting shaft 2 over the pin 16 and 18 and the contoured disk 20 and 22 even the shifting fork 10 is axially displaced and a gear stage can be engaged in the transmission.

Figure 2:
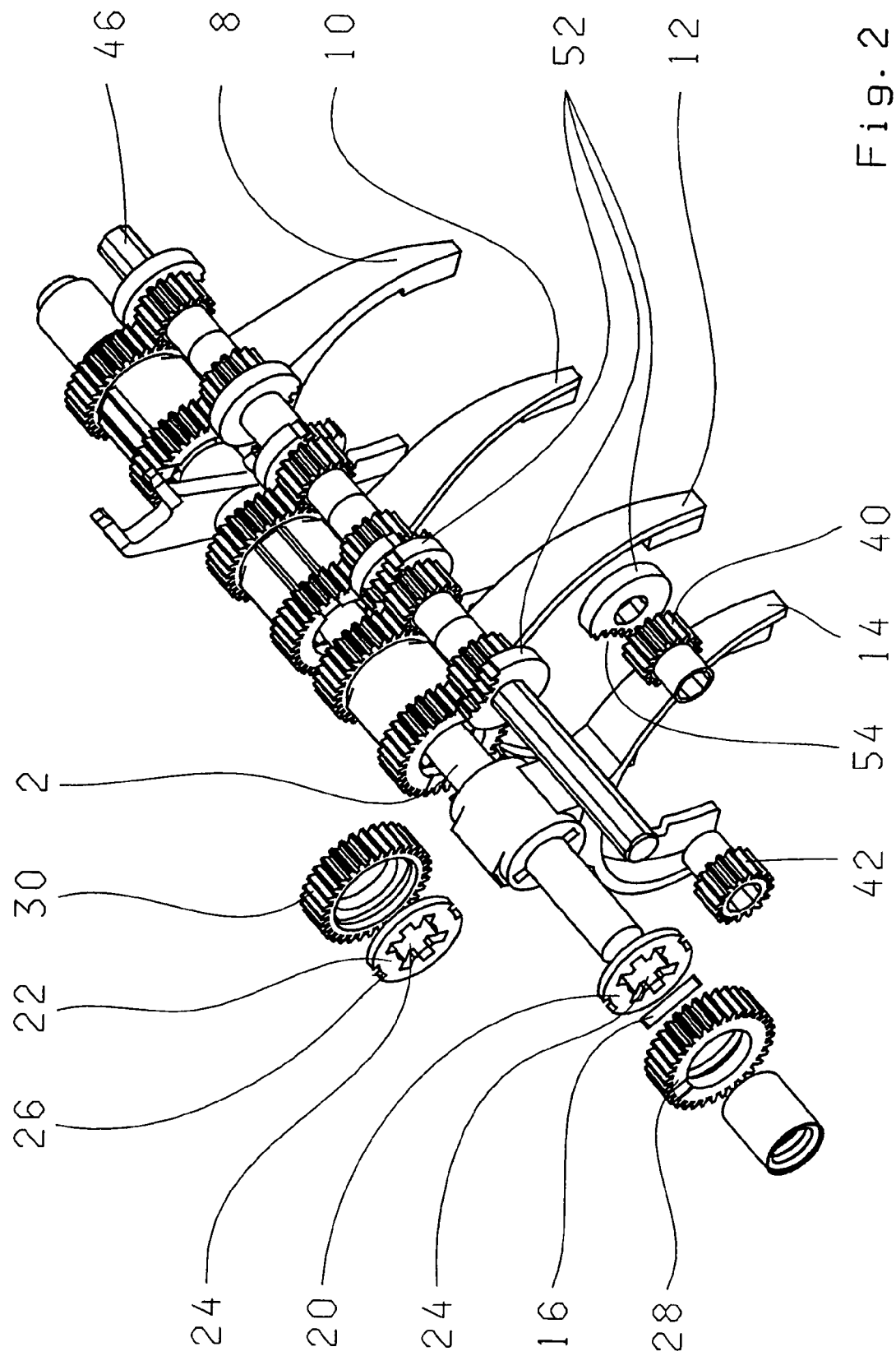
FIG. 2 is a second presentation of detailed elements of a second embodiment of the shifting device.

In order to turn the contoured disk 20 and 22 on the shifting shaft 2, the contoured disk 20 and 22 possesses a contoured surface (hereinafter "contour 26") on its outer circumference, which co-acts with a complementary contour on a ring-shaped engagement unit 28 and/or 30 and forms a turn-fast connection between the contoured disk 20 and 22 and the ring-shaped engagement unit 28 and 30 (FIG. 2).

Such a device, basically including a ring-shaped engagement unit 32 is pictured in its location on the shifting fork 12, wherein currently two single, ring-shaped engagement units are combined to form one component. In order to enable a rotation of the ring-shaped engagement unit 32 on the shifting shaft 2, without interfering with the arms of the shifting fork 12, the ring-shaped engagement unit 32 is furnished with a recess 34. On the outer circumference of the ring-shaped engagement units 28, 30, 32 is provided a toothing 36, which can stand in engagement with corresponding toothing 38, 40 on gears 42 and 44. This is correspondingly valid for all shifting forks 8, 10, 12 and 14. The gears 42 and 44 are turn-fast affixed on a shaft 46, which is essentially aligned parallel to shifting shaft 2. The shaft is rotated by an actuator 48 such as, for example, an electric motor through a ratio train with a toothing 50. The arrangement however, can also be so designed that the actuator 48 is directly bound to the shaft 46 without the ratio train. Laterally located to the gears 42 and 44 is respectively a blocking disk 52 of a blocking apparatus, which does not possess a complete, circular circumference, but has a recess in the form of a circular segment 54.

The blocking disks 52 of the differing shifting forks 8, 10, 12, 14 also exhibit such segmental cutoffs at various positions on their circumferences, so that the two blocking disks 52 always present the same cutoffs to one shifting fork, while otherwise, the cutoffs on the blocking disks 52 of the other shifting forks are provided for rotation about the axis of the common shaft 46. The blocking disks 52 act together with the ring-shaped engagement units 28, 30, 32 for the formation of the blocking apparatus, for example by the edges of the toothings of the ring-shaped engagement unit 28, 30, 32. In this way, the blocking disks 52 hold the ring-shaped engagement units 28, 30 32 and therewith also hold the shifting forks in their axial position on the shifting shaft 2 and only permit an axial movement of the currently selected shifting fork in the area of the segment 54 on the blocking disk 52.

The shifting shaft 2 is connected to an actuator 60 by way of a transfer block 56 with a ball-joint drive 58 which is, in turn, connected to an actuator 60, for instance, an electric motor. Instead of the ball drive 58, this power transfer can be accomplished by a gear drive (not shown). The illustrated actuators 48 and 60 are shown in FIG. 1 as being co-axial or axis parallel to the shaft 2 and 46 which is to be placed in motion. By way of an appropriate directive gear drive, the possibility exists that an assembly, which stands at an angle to the shaft, may also be installed at a right angle, for instance.

In order to shift the gear stage, it is necessary that the shifting forks 8, 10, 12 or 14 be pushed axially. The shifting forks 8, 10, 12 and 14 are freely supported on the shifting shaft 2 and for engagement, these must be axially shape-fit with the shifting shaft 2 by the pins 16, 18 and the contoured disk 20, 22. The toothed ring-shaped engagement units 28, 30, 32 are rotated by the shaft 46, which shaft is provided with gears 42, 44. The shifting shaft 2 moves itself for the engagement of the gear stages only in the axial direction. The selective preliminary choice of the gear stage to be shifted is carried out in that the contoured disk 20, 22 are rotated by the ring-shaped engagement units 28, 30, 32 which encompass them and thereupon close a discrete angle. Analogous to this angle, the cutouts 24 in the contoured disks 20, 22 are provided which, by way of the non-shifted gear stages, as soon as the shifting shaft moves itself, lead to an engagement of the pins 16 and/or 18 and thereby to no correspondingly movement contoured disk of the corresponding shifting fork. In the case of the fork to be shifted which is in this position, its necessary contoured disk 20 and 22 lacks an internal opening 24, so that the fork undergoes an axial movement and the desired gear stage is engaged. In each of the different selection positions, there is always one contoured pair 20, 22 without internal cutouts 24 in overlap with the rods 16, 18 so that an action can be initiated. All of the rest of the ring-shaped engagement units are coinciding with the internal cutouts 24 with the appropriate rods 16, 18 and no axial motion can occur.

FIG. 2 shows a shifting device in accord with FIG. 1 in a partially released condition. In this case, the segments 54 on the blocking disks 52 are provided with a toothing, so that the blocking disks in the non-blocking angular position can mesh into the outer toothing of the appropriate ring-shaped engagement unit 28, 30. The ring shaped engagement units 28, 30 are designed here as separate components so that the necessity of the formation of toothing 36, as is required with the ring-shaped engagement unit 32, is eliminated.

Since the elements taking part in the selection of the shifting fork to be shifted are exposed only to comparatively small forces, the design of these elements finds that a construction material of a lesser structural strength will suffice. Such a material would be plastic or a metal other than steel, but possibly including aluminum. Aluminum, in comparison to steel, is a low strength metal and plastic, both in comparison to steel and aluminum, in turn, is a material of lesser strength.

Appropriate for a plastic construction, in the present embodiment, is the ratio determining stage with the toothing 50 to which can be added the shaft 46 and all gears 42, 44 and blocking disks 52 which are on the shaft 46. Likewise, the ring-shaped engagement units 28, 30, 32 can be made of plastic both in the assembled state as well as in the separate part versions. The elements of plastic can be pre-manufactured and require no or only minuscule reworking. This is essentially cheaper than the construction materials for systems built of greater structural strength. A further advantage can be found with elements made of plastic producing a lesser generation of noise, since plastic possesses, essentially, a noise dampening function. Known at the present time and generally criticized noise problems, such as rattling in the transmission and scraping of gears, can be avoided by the above system.

REFERENCE NUMERALS 2 shifting shaft
4 bearing
6 bearing
8 shifting fork
10 shifting fork
12 shifting fork
14 shifting fork
16 pin
18 pin
20 contoured disck (externally)
22 contoured disk (externally)
24 internal opening of 20, 22
26 contour at outer circumference
28 rich-shaped engagement unit
30 ring-shaped engagement unit
32 ring-shaped engagement unit
34 cutout
36 toothing
38 toothing
40 toothing
42 gear
44 gear
46 shaft
48 actuator
50 toothing
52 blocking disk
54 segment
56 transfer block
58 universal ball joint
60 actuator

The invention claimed is:

1. A shifting device for shifting a transmission, the shifting device comprising:
an axially slidable shifting shaft (2) supporting a plurality of shifting forks (8, 10, 12, 14) which are each one of axially slidable relative to the shifting shaft (2), when the shifting fork (8, 10, 12, or 14) is blocked, and carried axially along with the shifting shaft (2), when the shifting fork (8, 10, 12, 14) is selected, for carrying out a desired shift;
a selection apparatus (28, 30, 32, 42, 44, 46) for selecting a desired one of the plurality of shifting forks (8, 10, 12, 14) which moves axially along with the shifting shaft (2) and carries out the desired shift; and
at least one blocking apparatus (52) for preventing movement of non-selected shifting forks (8, 10, 12, 14) while allowing axial movement of the selected desired one of the plurality of shifting forks (8, 10, 12, 14) along with the shifting shaft (2);
wherein elements (2, 8, 10, 12, 14, 20, 22) for carrying out the shift are manufactured from a material which has a relatively high structural strength while elements of the selection apparatus (28, 30, 32, 42, 44, 46) and the at least one blocking apparatus (52) are manufactured of a material which has a less structural strength than the elements (2, 8, 10, 12, 14, 20, 22) for carrying out the shift.

2. The shifting device according to claim 1, wherein ring-shaped engagement units (28, 30, 32) on the shifting forks (8, 10, 12, 14) interacts with the at least one blocking apparatus (52) for preventing axial movement of the non-selected shifting forks with the shifting shaft (2).

3. The shifting device according to claim 1, wherein contoured disks (20, 22) possesses cutouts (24) for ring-shaped engagement units (28, 30, 32), which co-act with projections (16, 18) on the shifting shaft (2) such that the projections (16, 18) pass through the cutouts (24), if a corresponding one of the plurality of shifting forks (8, 10, 12, 14) is not selected, and the projections (16, 18) abut and push the contoured disks (20, 22) axially, if the shifting fork (8, 10, 12, 14) is selected.

4. The shifting device according to claim 1, wherein the elements of the selection apparatus (28, 30, 32, 42 and 46) have teeth (36, 38, 40) which mutually mesh and enable a rotation of the elements of the selection apparatus (28, 30, 32, 42, 44, 46) with respect to each other.

5. The shifting device according to claim 1, wherein the elements (2, 8, 10, 12, 14, 20, 22) for carrying out the shift are constructed from one of steel and aluminum.

6. The shifting device according to claim 1, wherein the elements (28, 30, 32, 42, 44, 46) of the selection apparatus are manufactured from one of aluminum and plastic.

7. The shifting device according to claim 1, wherein the blocking apparatus (52) is constructed from one of aluminum and plastic.

8. The shifting device according to claim 1, wherein the selection apparatus includes, for each of the plurality of shifting forks (8, 10, 12, 14), a ring-shaped engagement unit (28, 30, 32) which is axially affixed with the respective shifting fork (8, 10, 12, 14) and is slidable with the shifting shaft (2) for carrying out the shift, each of the ring-shaped engagement units (28, 30, 32) is rotatable about the shifting shaft (2) for selection of the desired one of the plurality of shifting forks (8, 10, 12, 14) and has elements of a come-along apparatus (20, 22) which enables axial displacement of the ring-shaped engagement units (28, 30, 32) with axial movement of the shifting shaft (2) such that the selected one of the shifting forks (8, 10, 12, 14) carries out the desired shift.

9. The shifting device according to claim 8, wherein only a portion of each of the ring-shaped engagement units (32) has teeth (36).

10. The shifting device according to claim 8, wherein the at least one blocking apparatus includes rotatable blocking disks (52), the rotatable blocking disks (52) have a circumferential surface which is located in an axial movement zone of the ring-shaped engagement units (28, 30, 32) and extends inward, a contour of the rotatable blocking disks (52) is designed as segments (54) of the blocking disks (52) to permit axial movement of the ring-shaped engagement units (28, 30, 32) with the shifting shaft (2), while remaining areas of the blocking disks (52) prevent axial movement of the ring-shaped engagement units (28, 30, 32).

11. The shifting device according to claim 10, wherein an area of the blocking disks (52), designed as a cutout (54), have teeth which mesh with teeth of the ring-shaped engagement units (28, 30).

12. The shifting device according to claim 1, wherein a shaft actuator (60) is provided for axial activation of the shifting shaft (2) and a selection actuator (48) is provided which activates the elements (28, 30, 32, 42, 44, 46) of the selection apparatus and the blocking apparatus (52).

13. The shifting device according to claim 12, wherein a transmission unit (58) is provided for converting rotational movement of the shaft actuator (60) into axial movement of the shifting shaft (2) and activating the shifting shaft (2).

14. The shifting device according to claim 12, wherein the shaft actuator (60) and the selection actuator (48) are each one of an electro-mechanical actuator, a pneumatic actuator, and a hydraulic actuator.

15. A shifting device for shifting a transmission, the shifting device comprising:

an axially slidable shifting shaft (2) supporting a plurality of shifting forks (8, 10, 12, 14), each of the shifting forks (8, 10, 12, 14) is axially slidable relative to the shifting shaft (2), when the shifting fork ( 8, 10, 12 or 14) is blocked, and is carried axially along with the shifting shaft (2), when the shifting fork (8, 10, 12, 14) is selected, for carrying out a desired shift; pg,16 a selection apparatus (28, 30, 32, 42, 44, 46) for selecting a desired one of the plurality of shifting forks (8, 10, 12, 14) to move axially along with the shifting shaft (2) and carry out the desired shift; and a plurality blocking apparatus (52) for preventing axial movement of non-selected shifting forks (8, 10, 12, 14) while allowing axial movement of the selected desired one of the plurality of shifting forks (8, 10, 12, 14) along with the shifting shaft (2);

wherein at least the plurality of shifting forks (8, 10, 12, 14) end other elements (2, 8, 10, 12, 14, 20, 22) for carrying out the shift are manufactured from a material which has a relatively high structural strength while the elements of the selection apparatus (28, 30, 32, 42, 44, 46) and the plurality of blocking apparatus (52) are manufactured of a material which has a less structural strength than the elements (2, 8, 10, 12, 14, 20, 22) for carrying out the shift.

* * * * *